(12) United States Patent
Ohnishi et al.

(10) Patent No.: US 7,674,998 B2
(45) Date of Patent: Mar. 9, 2010

(54) CUTTING MACHINE

(75) Inventors: Satoshi Ohnishi, Komatsu (JP);
Yoshihiro Yamaguchi, Komatsu (JP)

(73) Assignee: Komatsu Industries Corporation, Komatsu-shi (JP)

( * ) Notice: Subject to any disclaimer, the term of this patent is extended or adjusted under 35 U.S.C. 154(b) by 606 days.

(21) Appl. No.: 11/597,286

(22) PCT Filed: May 26, 2005

(86) PCT No.: PCT/JP2005/009658

§ 371 (c)(1),
(2), (4) Date: Nov. 22, 2006

(87) PCT Pub. No.: WO2005/115674

PCT Pub. Date: Dec. 8, 2005

(65) Prior Publication Data

US 2008/0028907 A1    Feb. 7, 2008

(30) Foreign Application Priority Data

May 27, 2004    (JP) .............................. 2004-157503

(51) Int. Cl.
*B23K 9/00* (2006.01)
(52) U.S. Cl. .............. 219/121.39; 219/121.4; 219/121.67; 219/121.68; 83/471.2; 83/34
(58) Field of Classification Search ............ 219/121.39, 219/40, 41, 42, 43, 44, 67, 68, 69, 70, 71, 219/72
See application file for complete search history.

(56) References Cited

U.S. PATENT DOCUMENTS 6,664,495 B2    12/2003    Yamaguchi et al.

2003/0226675 A1 *    12/2003    Osborn et al. ........... 174/17 VA

FOREIGN PATENT DOCUMENTS

JP    16135/1975 U    2/1975
JP    60-137571 A    7/1985

(Continued)

OTHER PUBLICATIONS

International Search Report of PCT/JP2005/009658, date of mailing Sep. 13, 2005.

*Primary Examiner*—Tu B Hoang
*Assistant Examiner*—Hung Nguyen
(74) *Attorney, Agent, or Firm*—Westerman, Hattori, Daniels & Adrian, LLP

(57)    ABSTRACT

To enable the amount of air capable of bringing smoke to the vicinity of a discharge opening of a gas discharge chamber to be sent into the gas discharge chamber. A cutting machine has gas discharge chambers arranged side by side by partitioning the inside of a table, blower openings each provided on one end side of a gas discharge chamber, gas discharge openings each provided on the other side of the gas discharge chamber, and fans for sending air, while moving to the outside of the table, to at least one gas discharge chamber from the blower opening of the gas discharge chamber and arranged in the direction of the movement. The fans are arranged at intervals such that two or more fans face the blower opening of one gas discharge chamber, and the two or more fans can simultaneously send air to the one gas discharge chamber.

8 Claims, 13 Drawing Sheets

4  EMPTY SPACE
10 CUTTING MACHINE
12 TABLE
13 WORK AREA
14 PLATE
16 X-AXIS TRACK
18 MOVING CARRIAGE
20 Y-AXIS BOOM
22 CARRIAGE
24 CUTTING HEAD
28 CONNECTING DUCT
30 DUST COLLECTOR
40 CONTROLLER

FOREIGN PATENT DOCUMENTS

| | | |
|---|---|---|
| JP | 60-43231 B2 | 9/1985 |
| JP | 2000-052091 A | 2/2000 |
| JP | 2002-103032 A | 4/2002 |
| JP | 2003-136248 A | 5/2003 |
| KR | 2003-0035927 A | 5/2003 |

* cited by examiner

| 4 | EMPTY SPACE |
|---|---|
| 10 | CUTTING MACHINE |
| 12 | TABLE |
| 13 | WORK AREA |
| 14 | PLATE |
| 16 | X-AXIS TRACK |
| 18 | MOVING CARRIAGE |
| 20 | Y-AXIS BOOM |
| 22 | CARRIAGE |
| 24 | CUTTING HEAD |
| 28 | CONNECTING DUCT |
| 30 | DUST COLLECTOR |
| 40 | CONTROLLER |

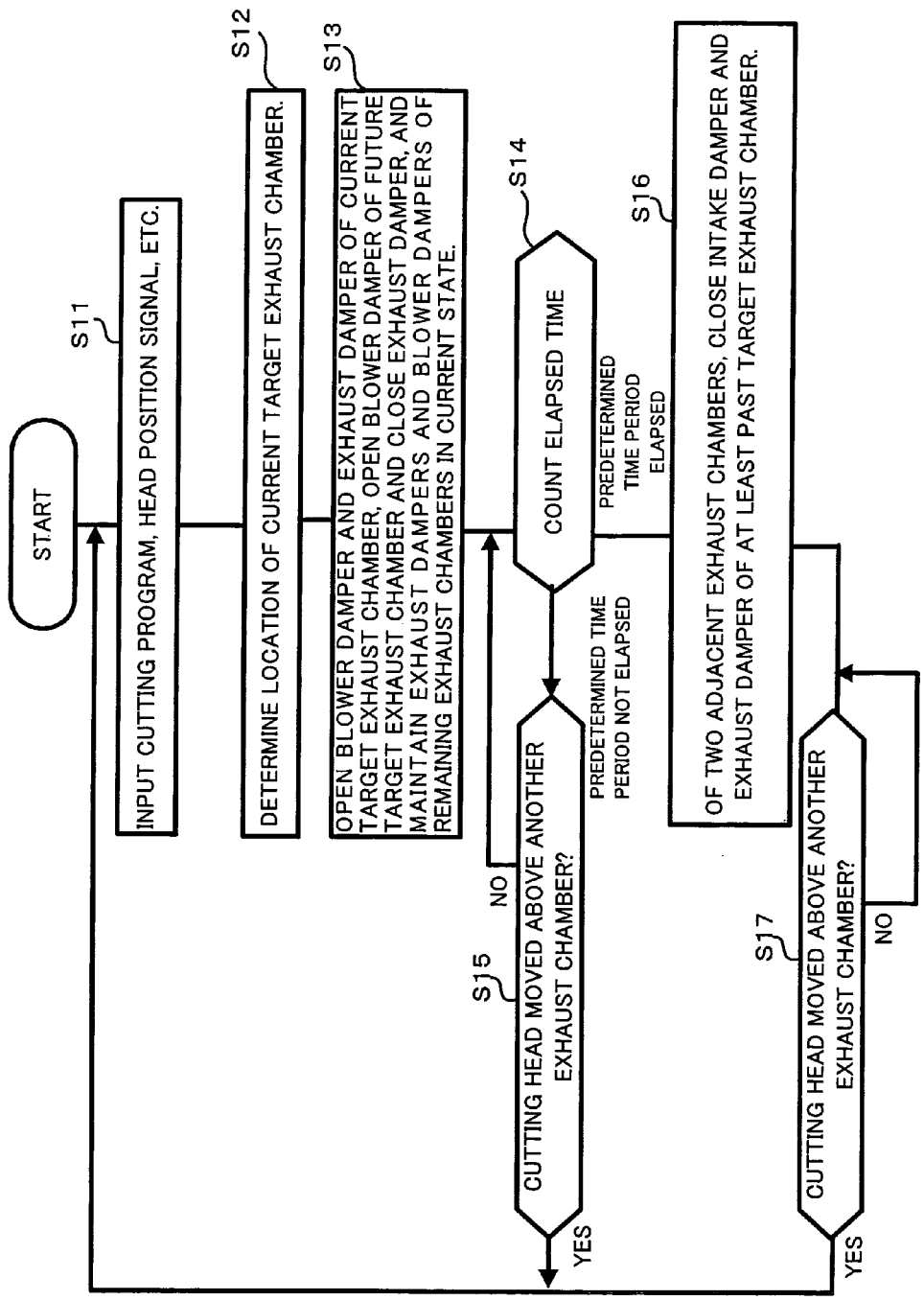

81A-F SUCTION FANS

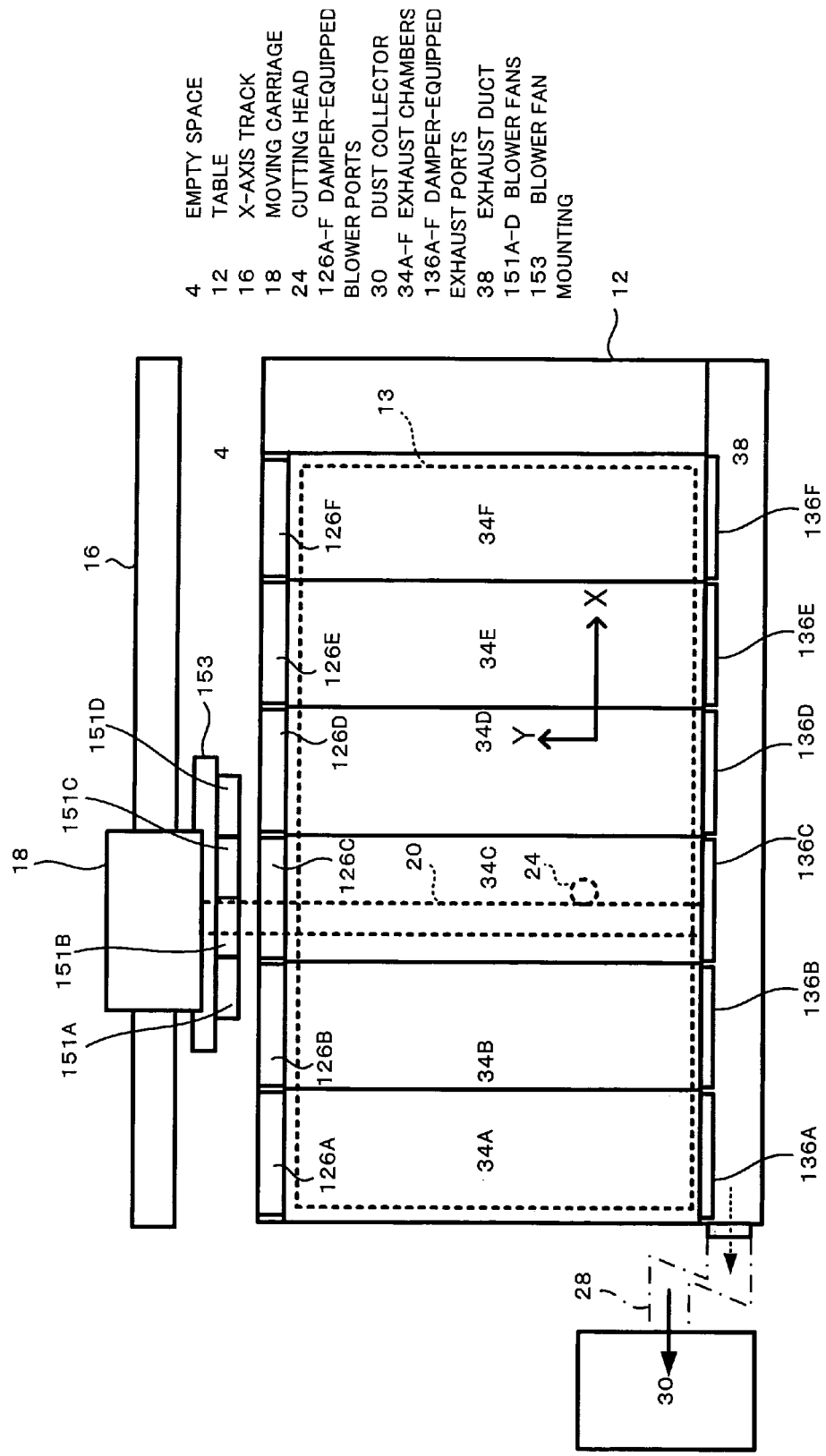

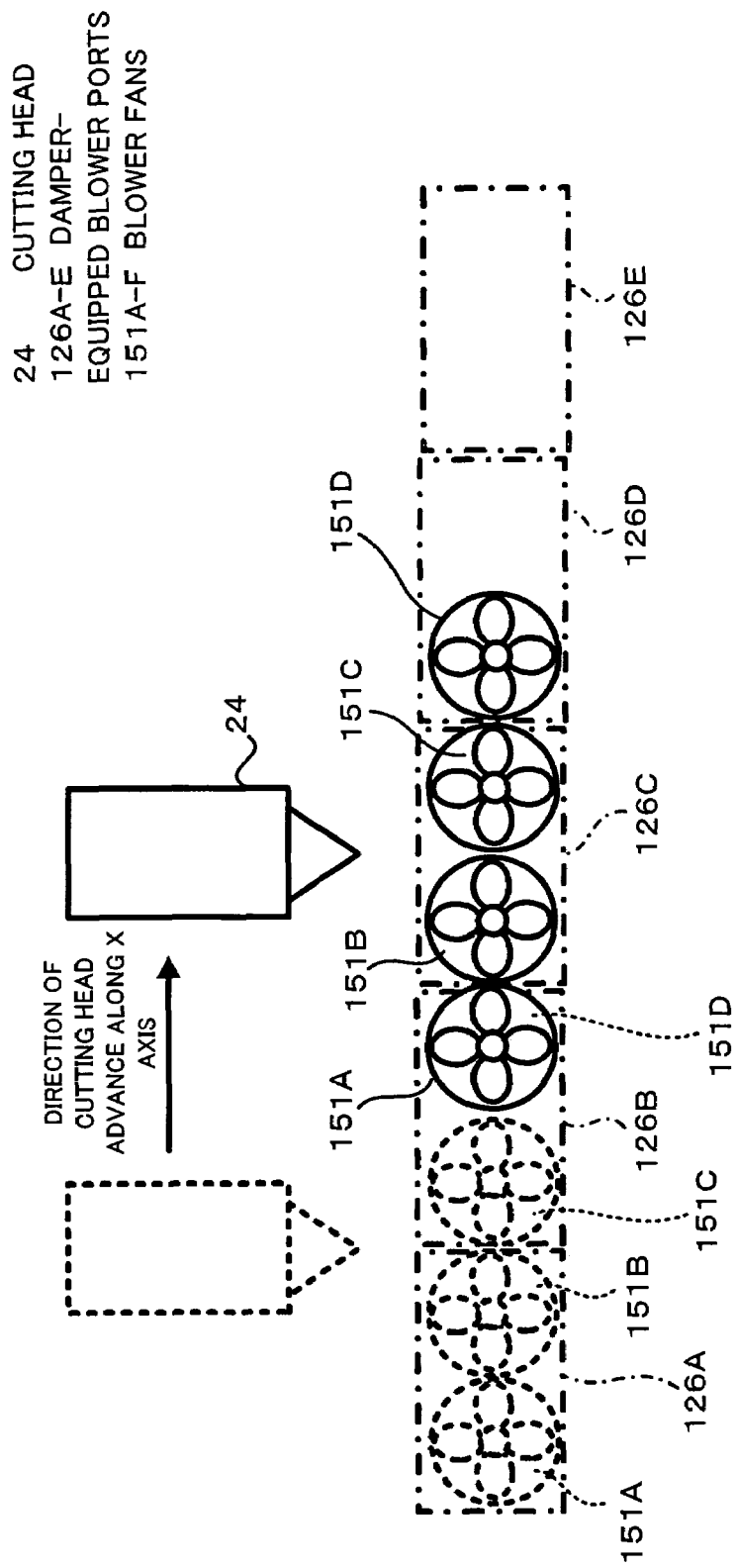

CUTTING MACHINE

BACKGROUND OF THE INVENTION

1. Field of the Invention

The present invention relates to a cutting machine that cuts a plate set on the work area of a table, and more particularly, to a technology for ventilating an exhaust chamber inside the table of the cutting machine.

2. Description of the Related Art

As typical examples of the cutting machines of this type there are thermal cutting machines, such as plasma cutting machines that use a plasma torch as the cutting head, laser cutting machines that use laser torches, and gas cutting machines that use gas burners. When plate material placed on a table is cut using these types of cutting machines, fumes, high-pressure gas and the like (hereinafter for simplicity called "exhaust fumes") appear in the table from the underside of the plate. As a result, generally, these types of cutting machines have exhaust chambers in the table and discharge exhaust fumes appearing inside the exhaust chambers to outside the exhaust chambers. As technology for discharging exhaust fumes to the outsides of the exhaust chambers, there is, for example, the technology disclosed in JP-B-S60-43231 and JP-A-2003-136248.

JP-B-S60-43231 describes a plasma cutting machine technology involving a smoke path provided inside the cutting table and partitioned at right angles to the direction of movement of a carriage mounting a plasma torch, a pair of suction and blower hoods mounted on the carriage and disposed opposite each other across the smoke path inside the cutting table, and a dust collector mounted on top of the carriage. The suction hood and the blower hood are each connected to the dust collector by ducts, and the dust collector both sucks air from the suction hood via the duct as well as blows air from the blower hood via the duct. In other words, the dust collector acts as both a vacuum, sucking air from within the smoke path, and a blower, sending air into the smoke path.

JP-A-2003-136248 discloses providing a plurality of exhaust chambers in the table, connecting each exhaust chamber to a dust collector via a damper-equipped exhaust duct, and efficiently ventilating fumes getting inside the table during cutting by shifting the open damper with the movement of the head.

According to JP-B-S60-43231, specifically, the dust collector takes up and cleans the exhaust fumes generated in the smoke path and returns the cleansed exhaust fumes back into the smoke path inside the table. In general, the exhaust fumes from plasma cutting are of a high temperature. As a result, although they may be cleaned by the dust collector, when those exhaust fumes are blown into the table their lighter specific gravity creates a rising air current that causes the exhaust fumes to dance upward and leak from the top of the table to the outside of the cutting machine.

Moreover, according to JP-B-S60-43231, the dust collector that is the source of air blown into the table smoke path is present at a location that is separated from the smoke path. As a result, the amount of wind that is sent into the smoke path via the blower hood is not enough to push the exhaust fumes to the vicinity of the suction hood.

Further, according to JP-B-S60-43231, since both the blower hood and the suction hood are provided on the moving carriage, when carrying out cutting that moves the carriage at high speed the blower hood and the suction hood move to the next segment of the table while fumes still remain in one segment of the table, with the result that the remaining fumes leak from the machine.

According to JP-A-2003-136248, a blower such as an electric fan is fixedly mounted on the table in the vicinity of the blower port of each of the exhaust chambers inside the table. According to this construction, the greater the number of exhaust chambers (for example, the longer the table in the direction of alignment of the exhaust chambers), the greater the number of blowers mounted on the table.

SUMMARY OF THE INVENTION

Accordingly, an object of the present invention is send into the exhaust chambers enough air to push the exhaust fumes to the vicinity of the exhaust ports of the exhaust chambers.

A separate object of the present invention is to prevent the exhaust fumes from leaking to the outside of the cutting machine to the extent possible.

Another and separate object of the present invention is to not increase the number of blowers even when there are a large number of exhaust chambers.

A cutting machine according to a first aspect of the present invention comprises a table (12) for accommodating a plate (14); a cutting head (24) for cutting a plate placed on the table; a head movement system (16, 18, 20, 22) that moves the cutting head; a plurality of exhaust chambers (34A-34F) aligned so as to partition the interior of the table (12); blower ports (126A-126F) provided along one end side of each exhaust chamber; exhaust ports (136A-136F) provided along the other end side of the each exhaust chamber; and a plurality of fans (151A-151F) aligned parallel to a direction of movement that blow air into at least one exhaust chamber from the exhaust port of the exhaust chambers while moving along the outside of the table, wherein the plurality of fans is aligned so that two or more fans are disposed opposite the blower port of one exhaust chamber, the two or more fans blowing air into one exhaust chamber simultaneously.

According to such a cutting machine, the plurality of fans moves along the outside of the table and can therefore cover a plurality of exhaust chambers, and therefore the number of fans is not increased even when there are a large number of exhaust chambers. In addition, according to such a cutting machine, the plurality of fans is aligned at intervals therebetween such that two or more fans are disposed opposite the blower port of one exhaust chamber, the two or more fans blowing air into one exhaust chamber simultaneously, thereby facilitating the acquisition of an amount of air needed to ventilate the exhaust chamber.

In one embodiment of the cutting machine, the width of each blower port of each exhaust chamber may be substantially the entire width of each exhaust chamber, such that the two or more fans blow air across the entire width of at least one exhaust chamber, thereby facilitating the acquisition of an amount of air needed to ventilate the exhaust chamber.

In one embodiment of the cutting machine, the plurality of fans may be aligned at intervals therebetween that are narrower than the width of one fan. Specifically, for example, the plurality of fans may be aligned substantially without intervals therebetween. Such a structure enables more air to be blown into a single exhaust chamber from the blower port of that exhaust chamber.

The cutting machine according to a second aspect of the present invention comprises a table (12) for accommodating a plate (14); a cutting head (24) for cutting a plate placed on the table; a head movement system (16, 18, 20, 22) that moves the cutting head; a plurality of exhaust chambers (34A-34F) aligned so as to partition the interior of the table (12); blower ports (126A-126F) provided along one end side of each exhaust chamber; exhaust ports (136A-136F) provided along the other end side of the each exhaust chamber; and a plurality of fans (251A-251H) aligned parallel to a direction of movement that blow air into at least one exhaust chamber from the exhaust port of the exhaust chambers while moving along the outside of the table, wherein the plurality of fans is aligned over a distance equal to or greater than the width of at least three exhaust chambers, so as to enable air to flow into at least three exhaust chambers simultaneously.

According to such a cutting machine, the plurality of fans moves along the outside of the table and can therefore cover a plurality of exhaust chambers, and therefore the number of fans is not increased even when there are a large number of exhaust chambers. In addition, according to such a cutting machine, the plurality of fans is aligned over a distance equal to or greater than the width of at least three exhaust chambers, so as to enable air to flow into the at least three exhaust chambers simultaneously, and therefore, compared to ventilating only a single exhaust chamber (for example, the exhaust chamber located directly beneath the cutting), it can be expected that exhaust fumes will not leak from the cutting machine.

In one embodiment of the cutting machine, the width of each blower port of each exhaust chamber may be substantially the entire width of each exhaust chamber, such that the two or more fans blow air across the entire width of at least one exhaust chamber, thereby facilitating the acquisition of an amount of air needed to ventilate the exhaust chamber.

In one embodiment of the cutting machine, the plurality of fans may be aligned at intervals therebetween that are narrower than the width of one fan. Specifically, for example, the plurality of fans may be aligned substantially without intervals therebetween. Such a structure enables more air to be blown into a single exhaust chamber from the blower port of that exhaust chamber.

It should be noted that the following embodiments may be made of at least one of the cutting machines according to the above-described first and second aspects.

Specifically, in one embodiment, the table may be a box-shaped table (12) having on a top surface thereof a rectangular work area (13) on which to place a plate (14). In addition, the head movement system may move the cutting head in the direction of an X axis along a long side of the work area and a Y axis along a short side of the work area with respect to the plate on the work area. The plurality of exhaust chambers may be disposed so as to partition the interior of the table in a direction that cuts across the X axis (for example, parallel to the Y axis). In addition, the plurality of fans may move in the direction of the X axis near the blower ports.

Moreover, in one embodiment, the cutting machine may further comprise a first ventilator (30) that forcibly discharges the air inside the plurality of exhaust chambers. In addition, the position of the first ventilator may be fixed. In addition, the first ventilator may be a dust collector that takes up exhaust fumes discharged from the exhaust ports. In addition, the exhaust ports may be connected to the first ventilator via connecting members such as ducts (28, 38), so that the first ventilator forcibly discharges the air inside the plurality of exhaust chambers via the exhaust ports and connecting members. Further, in this embodiment, a plurality of sets of two or more exhaust ports may be designated and a first ventilator provided for each set.

In one embodiment, the cutting machine may further comprise second ventilators (81A-8F) disposed in the vicinity of each exhaust port to forcibly discharge the air from inside the exhaust chambers. The positions of the second ventilators may be fixed. In addition, the second ventilators may be fans.

In one embodiment, the head movement system may comprise a Y-axis movement system (20, 22) that moves together with the cutting head in the Y-axis direction and an X-axis movement system (16, 18) that moves together with the cutting head in the X-axis direction. A plurality of fans may be provided on the X-axis movement system.

In one embodiment, the plurality of fans may blow air into at least a target exhaust chamber located directly beneath the cutting head 24 during cutting among the plurality of exhaust chambers.

In one embodiment, the cutting machine may further comprise an X-axis track (16) of the X-axis movement system. The plurality of fans movable in the X-axis direction may be disposed between the table and the X-axis track (16).

In one embodiment, the plurality of fans may have a length in the X-axis direction that covers at least two adjacent exhaust chambers. Here, the term "cover" may mean either to cover completely or to cover partially.

In one embodiment, the exhaust ports may have exhaust dampers (96A-96F) that open and close. The cutting machine may further comprise a damper controller (40) that controls the opening and closing of each of the dampers. When the target exhaust chamber moves from a first exhaust chamber to an adjacent second exhaust chamber, the damper controller may open the second exhaust chamber exhaust damper and close the first exhaust chamber exhaust damper after a predetermined period of time elapses since the target exhaust chamber has been moved, while closing the exhaust dampers of all other exhaust chambers.

Other objects of the present invention will become apparent from the following description.

It should be noted that the reference numerals appearing in parenthesis herein merely illustrate correspondence to the elements depicted in the attached drawings and do not limit the technical scope of the present invention.

BRIEF DESCRIPTION OF THE DRAWINGS

FIG. 6 is a flow chart illustrating damper control;

FIG. 8 is one diagram illustrating a first other embodiment of the present invention;

FIG. 9 shows the relation between blower fan and blower port positions in the first other embodiment of the present invention;

DESCRIPTION OF THE PREFERRED EMBODIMENTS

Figure 1:
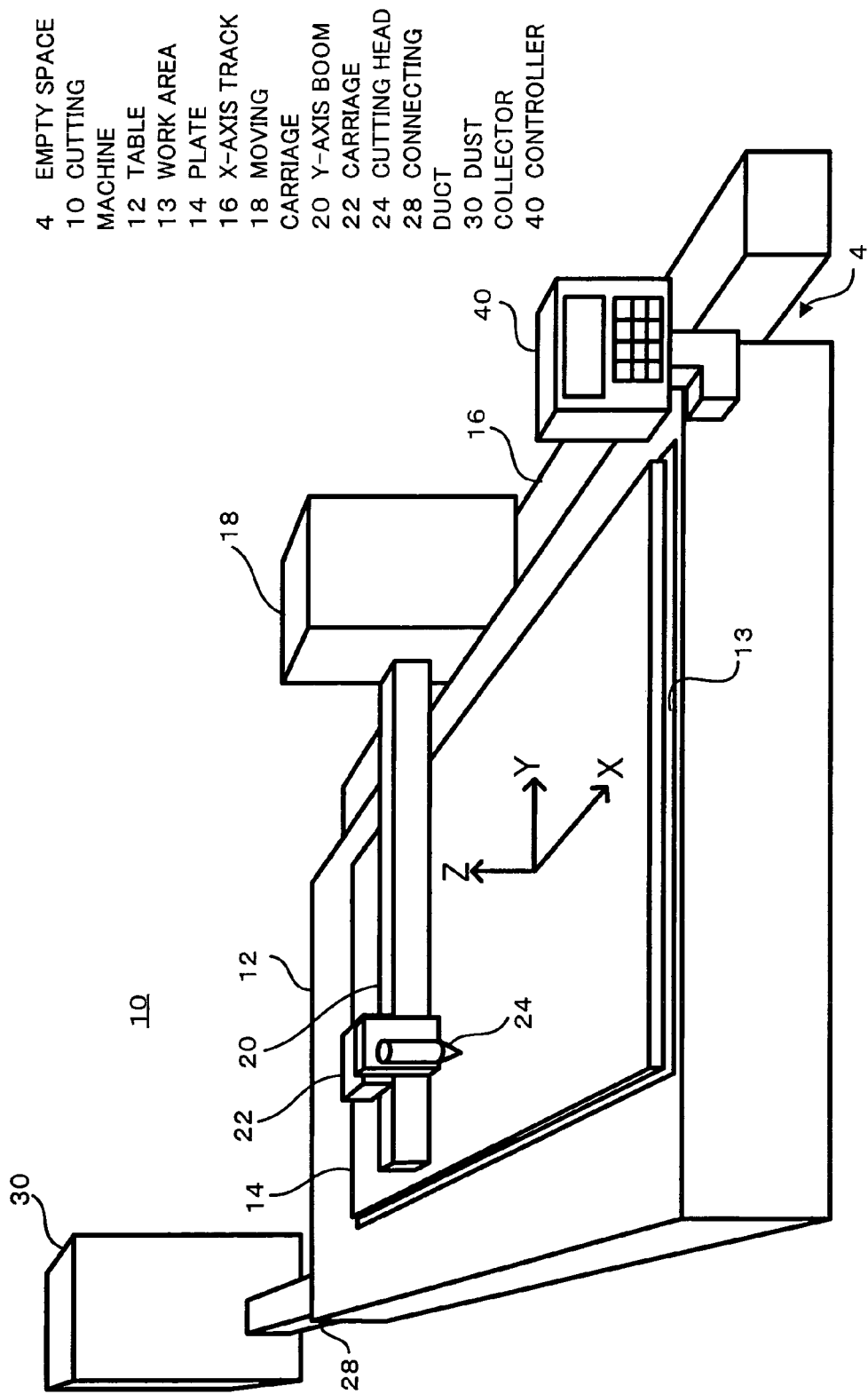
FIG. 1 is a perspective view showing the overall construction of a cutting machine 10 according to the present invention.

FIG. 1 is a perspective view showing the overall construction of a cutting machine according to the present invention.

As shown in FIG. 1, a cutting machine 10 comprises a box-like table 12 provided on the floor of the machine. A work area 13 is provide on the top surface of the table 12, and on this work area 13 a plate 14 that is the material to be cut is placed. In general, the plate 14 comes in rectangular standard sizes, such as 1.5 m×3 m or 2.4 m×6 m. The table 12 work area 13 is also a rectangular size suited to accommodate the particular standard sizes of the plate, and the table size, too, is a rectangular size that adds to the periphery of the work area 13 exhaust ducts and other such additional portions as are described later.

An X-Y-Z orthogonal coordinate system is defined for numerical calculation processing for the purpose of controlling the cutting position of the plate. The X axis of this X-Y-Z orthogonal coordinate system is parallel to the long sides of the work area 13, the Y axis is parallel to the short sides of the work area 13, and the Z axis is vertical to the surface of the work area 13.

An X-axis track 16 is provided parallel to the long sides of the work area 13 (the X axis), at the bottom of the side of the table. A long, empty space 4 in the direction of the X axis is formed between the table 12 and the X-axis track 16. A moving carriage 18 capable of moving in the Y-axis direction along the X-axis track 16 is provided on the X-axis track 16. A Y-axis boom 20 that extends straight out toward the short side of the work area 13 (Y axis) and above the work area 13 is fixedly mounted on the moving carriage 18. When the moving carriage 18 moves in the X-axis direction, the Y-axis boom 20 also moves with it in the X-axis direction. Although in the example shown in the drawing the Y-axis boom 20 is an arm supported by the moving carriage 18 only at one end, this is merely an illustration, and alternatively, the Y-axis boom 20 may be a gantry supported at both ends.

A carriage 22 capable of moving in the Y-axis direction along the Y-axis boom 20 is mounted on the Y-axis boom 20. A cutting head 24 is mounted on the carriage 22. The carriage 22 can move the cutting head 24 in the direction of the Z axis. The cutting head 24 is a plasma torch in the case of a plasma cutting machine for example, a laser torch in the case of a laser cutting machine, a gas burner in the case of a gas cutting machine, or, in the case of a composite-type cutting machine, a set composed of different types of the foregoing torches and burners. The cutting head 24 is driven and controlled by a controller 40 that is described later.

A head movement system for moving the cutting head 24 in the X-, Y- and Z-axis directions is composed of the above-described X-axis track 16, the moving carriage 18, the Y-axis boom 20 and the carriage 22. The head movement system can send the cutting head 24 to any position within the work area 13.

The controller 40 drives and controls the cutting machine 10 in accordance with operating instructions from a human, and in accordance with a cutting program. The functions of the controller 40 are described later.

The interior space of the table 12, not shown, is connected to a dust collector 30 through a connecting duct 28. The dust collector 30 sucks air from the interior of the table 12 during cutting of the plate 14, removing fumes and the like contained therein.

The cutting machine according to the present embodiment collects dust both by blowing air into the table 12 interior space as well as by sucking out the air in the table 12 interior space, in other words carries out so-called push-pull dust collection. A description follows of the internal structure of the table 12 and of the configuration of push-pull dust collection.

Figure 2:
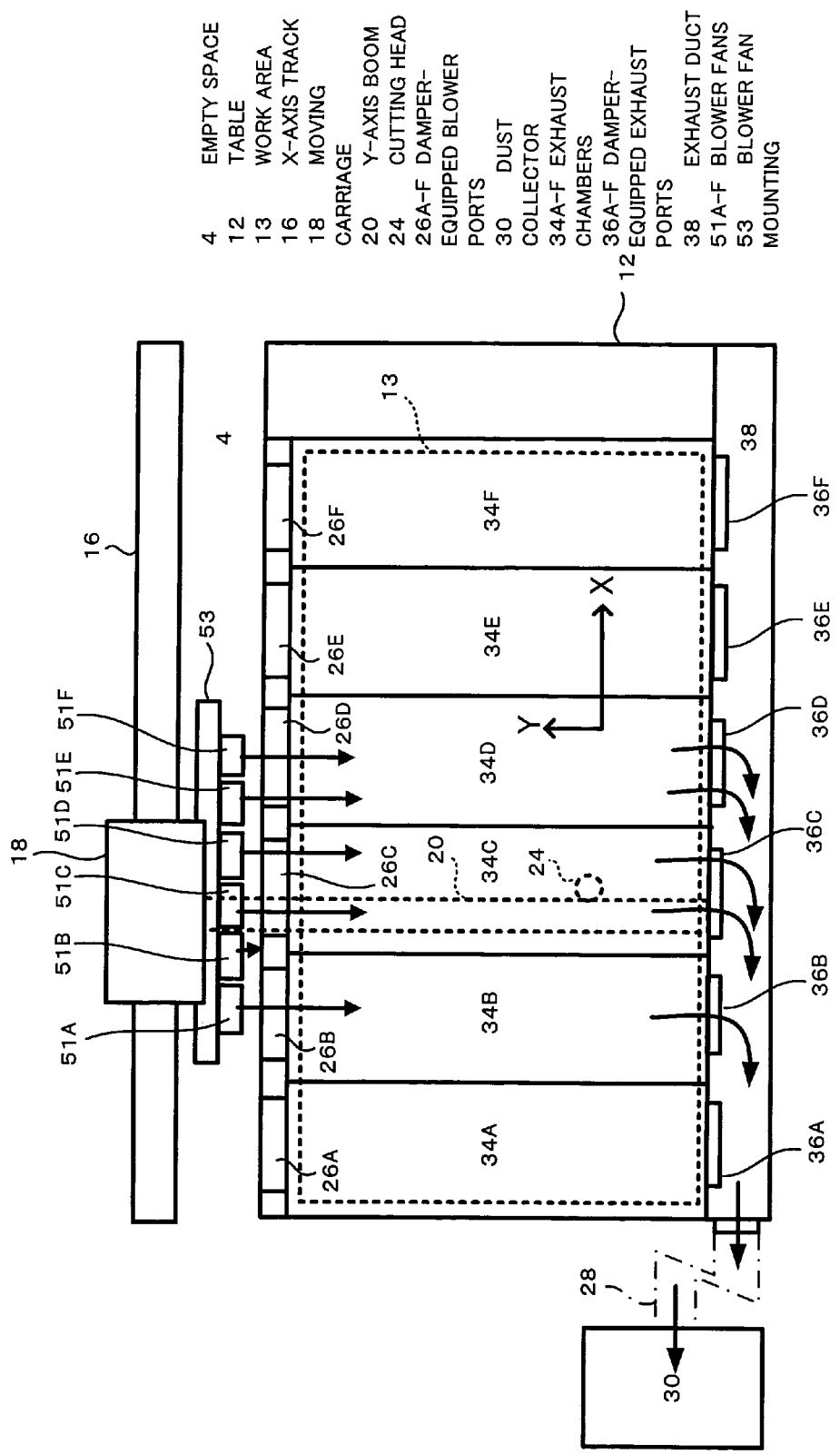
FIG. 2 illustrates the internal structure of a table 12 and the configuration of push-pull dust collection.

FIG. 2 illustrates the internal structure of a table 12 and the configuration of push-pull dust collection.

As shown in FIG. 2, inside the table 12 and beneath the work area 13 a plurality of exhaust chambers 34A-34F is aligned and disposed in the direction of the long sides of the work area 13 (the X-axis direction). These multiple exhaust chambers 34A-34F are aligned, for example, by dividing the interior of the table 12 in a direction that cuts laterally across the X axis (for example, dividing parallel to the Y-axis direction). The exhaust chambers 34A-34F are separated from each other by dividers. Each one of the exhaust chambers 34A-34F extends from one end to the other of the work area 13 in the direction of the short sides of the work area 13 (the Y-axis direction). The exhaust chambers 34A-34F, respectively, have at one end damper-equipped blower ports (hereinafter simply called "blower ports") 26A-26F and at the other end damper-equipped exhaust ports 36A-36F (hereinafter simply called "exhaust ports"). Blower dampers (see FIG. 3) 6A-6F are provided on the blower ports 26A-26F, respectively (although dampers are not required and may be eliminated), and exhaust dampers (see FIG. 3) 96A-96F are provided on the exhaust ports 36A-36F, respectively. By selectively opening one or more of the exhaust dampers (see FIG. 3) 96A-96F, one or more exhaust chambers to be ventilated are selected from among the exhaust chambers 34A-34F. The exhaust chambers 36A-36F communicate with an exhaust duct 38 inside the table 12. The exhaust duct 38 communicates with the connecting duct 28 and leads to an intake port of the dust collector 30.

Multiple (for example, six) blower fans 51A-51F are provided as blowers in the empty space 4 provided between the X-axis track (16) and a lateral side surface of the table 12. It should be noted that the blowers are not limited to blower fans, and consequently, other types of blowers such as air compressors or the like may be employed.

Each of the plurality of blower fans 51A-51F may be of any size. In the present embodiment, the size of the blower fans in the X-axis direction is approximately half the size of one blower port in the X-axis direction. In other words, the size of the blower fans is such as to cover one blower port with two blower fans. In addition, in the present embodiment the number of blower fans is smaller than the number of exhaust chambers.

The blower fans 51A-51F are, for example, mounted on a blower fan mounting 53 having a plurality of fan drive mechanisms (see FIG. 3) 94A-94F corresponding to each of the plurality of blower fans 51A-51F. The blower fan mounting 53 is mounted on the moving carriage 18, which enables the plurality of blower fans 51A-51F to move with the moving carriage 18, in other words, to move through the empty space 4 with the movement of the cutting head 24 in the X-axis direction.

In addition, the blower fans 51A-51F are mounted so as to blow onto the lateral side surface of the table disposed opposite the X-axis track 16 (in other words, blower ports 26A-26F). In other words, the plurality of blower fans 51A-51F faces the lateral side surface of the table having the blower ports 26A-26F, which allows air to be blown into one or more exhaust chambers together with the movement of the plurality of blower fans 51A-51F.

The plurality of blower fans 51A-51F is aligned in the X-axis direction. The length in the X-axis direction covered by the plurality of blower fans 51A-51F is shorter than the length in the X-axis direction of the plurality of exhaust chambers 34A-34F. However, as described above, the plurality of blower fans 51A-51F move in the X-axis direction together with the movement of the moving carriage 18, and therefore, as a result, can cover all the plurality of exhaust chambers 34A-34F.

The blower fans 51A-51F are mounted so as to be able to blow air into at least a target exhaust chamber located directly beneath the cutting head 24 through that target exhaust chamber's blower port (in the example shown in FIG. 2, blower port 26C of exhaust chamber 34C). In other words, the plurality of blower fans 51A-51F aligned in the X-axis direction is mounted on the moving carriage 18 via the blower fan mounting 53 so that the center of the plurality of blower fans 51A-51F (that is, the blower long in the X-axis direction) or the vicinity thereof and the cutting head 24 or the Y-axis boom 20 are at the same position in the X-axis direction, which enables the plurality of blower fans 51A-51F to move in the X-axis direction together with the movement of the cutting head 24 and blow air into the target exhaust chamber directly beneath the cutting head 24 if at that time at least the blower fans at the center of the plurality of blower fans 51A-51F or the in vicinity thereof (for example, 51C-51D) are being driven.

As described above, the blower fans 51C and 51D at or near the center of the plurality of blower fans 51A-51F are mounted on the moving carriage 18 so as to be located near and outside of the target exhaust chamber blower port (for example, positioned opposite the blower port). Other blower fans 51A and 51B are mounted on the moving carriage 18 so that at least one of them (or a portion of one blower fan) is located near and outside of (for example, positioned opposite) the blower port of the exhaust chamber (for example, 34B) rearwardly adjacent in the X-axis direction to the target exhaust chamber (for example, 34C). In addition, other blower fans 51E and 51F are mounted on the moving carriage 18 so that at least one of them (or a portion of one blower fan) is located near and outside of (for example, positioned opposite) the blower port of the exhaust chamber (for example, 34D) forwardly adjacent in the X-axis direction to the target exhaust chamber (for example, 34C). The foregoing structure enables not only the target exhaust chamber but also the exhaust chamber that the cutting head 24 has already passed and in which exhaust fumes might still remain to be ventilated whether the moving carriage 18 moves forward or rearward of it in the X-axis direction. In addition, the exhaust chamber to which the cutting head 24 will move next also can be ventilated, which, when that exhaust chamber becomes the target exhaust chamber, enables the exhaust fumes that appear first to be sent smoothly to the exhaust port side.

As is described later, the driving of the blower fans 51A-51F and the opening and closing of the blower dampers (see FIG. 3) 6A-6F and the exhaust dampers (see FIG. 3) 96A-96F are controlled by the controller 40. The controller 40 detects the position of the cutting head 24 in the X-axis direction (in the direction of the long sides) and controls the opening and closing of the exhaust dampers (see FIG. 3) 96A-96F so as to shift the exhaust chamber(s) to be ventilated as the cutting head 24 moves in the X-axis direction (the long sides) according to the position that is detected, which enables the capacity of the dust collector 30 to be concentrated on the exhaust chamber that requires ventilating and to improve ventilation efficiency.

For example, assume a case in which the current position of the cutting head 24 with respect to one exhaust chamber 34C, as indicated by the dotted lines in FIG. 2, is moving from right to left in the diagram as the cutting head 24 moves along the X axis. In this case, the exhaust chamber 34C that corresponds to the position of the cutting head 24 (hereinafter for simplicity called "the current target exhaust chamber") is selected as the exhaust chamber to be ventilated, and the exhaust damper of the exhaust port 36C of the current target exhaust chamber 34C is opened. In addition, exhaust chamber 34D, which is the exhaust chamber adjacent to exhaust chamber 34C and which the cutting head 24 has already passed (hereinafter for convenience called the "past target exhaust chamber"), also continues to be maintained in a state in which its exhaust port 36D exhaust damper is opened until a predetermined period of time after the passage of the cutting head 24 elapses (that is, a period of time for which fumes and other exhaust smoke are likely still to remain; for example, several seconds). Further, at the exhaust chamber 34B, which is the exhaust chamber adjacent to the exhaust chamber 34C which corresponds to the position of the cutting head 24 and to which the cutting head 24 will move next (hereinafter for convenience called "the future target exhaust chamber"), although the exhaust damper of the exhaust port 36B is in a closed state the blower fans 51A and 51B are driven. Doing so generates air currents inside the exhaust chamber 34B as preparation for the purpose of being able to start ventilating immediately once the exhaust chamber 34B is selected (incidentally, even when the exhaust damper is closed, air is discharged from gaps and the like in the plate 14 on top of the exhaust chamber 34B, thus generating air currents). The other, unselected exhaust chambers 34A, 34E and 34F are not ventilated.

Figure 3:
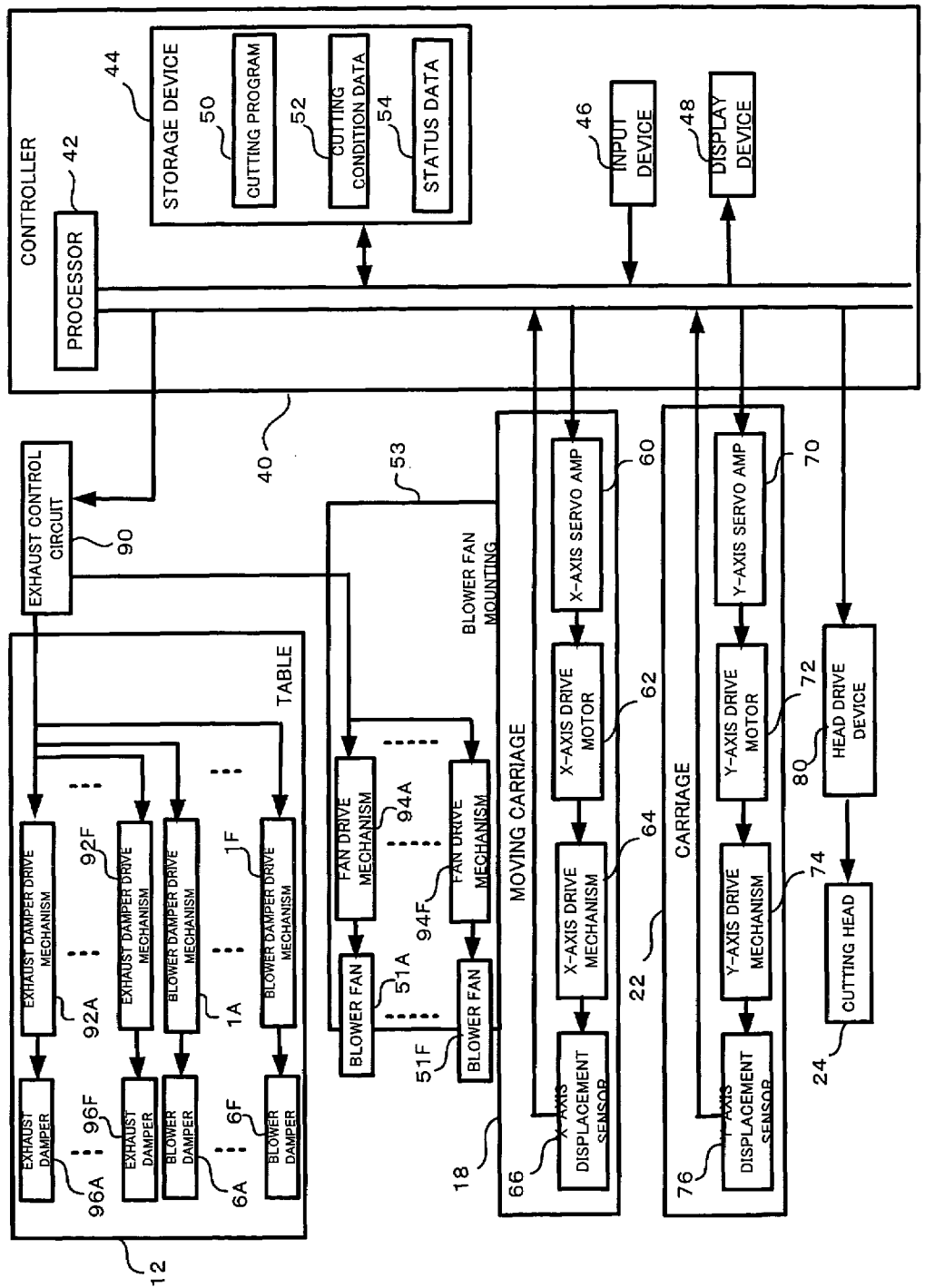
FIG. 3 is a block diagram showing the structure and functions of a controller 40.

FIG. 3 is a block diagram showing the structure and functions of the controller 40.

As shown in FIG. 3, the controller 40 comprises a processor 42, a storage device 44, an input device 46 and a display device 48. The processor 42 carries out a variety of calculation processes for controlling the operation of all parts of the cutting machine 10, and issues control signals based on the calculation results to all parts. In the storage device 44 are stored programs and data that the processor 42 uses, for example, a cutting program 50, cutting condition data 52, status data 54 and fast forward speed data 56 and the like. The input device 46 inputs to the controller 40 a variety of operating instructions, starting with the instruction from a human to start cutting as well as the cutting program 50, the cutting condition data 52, the status data 54 and the like. The display device 48 provides a graphical user interface for the controller 40.

The cutting program 50 describes information about the nesting of the plurality of products that are to be cut out from the plate 14, specifically, a head movement procedure that specifies along which path to move the cutting head 24 in accordance with what sort of product arrangement when cutting out the products from the plate 14.

The cutting condition data 52 describes a variety of possible cutting conditions, for example, the thickness and the material of the various plates 14 that can be used, the rated power of the various cutting heads 24 that can be used (such as the rated plasma electric current value and nozzle diameter in the case of a plasma torch, or the rated laser beam power value in the case of a laser torch) and the like. Desired cutting conditions can be selected from among the variety of cutting conditions in the cutting condition data 52 by instruction from the input device 46.

The status data 54 describes a variety of cutting status data corresponding to each of the variety of possible cutting conditions. Here, the cutting status data is the variety of statuses that are controlled when carrying out cutting, and is composed of multiple pieces of data such as the cutting speed (the speed of movement of the cutting head 24 along a cutting line) and the cutting head 24 drive status (the plasma electric current value and gas flow in the case of a plasma torch, the laser beam power value in the case of a laser torch, and so forth).

The processor 42 reads in the cutting program 50 and the cutting status data that corresponds to the cutting conditions selected from among the status data 54. In accordance with the order that the cutting program 50 specifies, the processor 42 controls the driving and the movement of the cutting head 24 so as to successively cut out a plurality of products from the plate 14. In the process of carrying out this control, the processor 42, when carrying out cutting out of the products, moves the cutting head 24 at the cutting speed specified by the read-in cutting status data. In addition, in the process of carrying out the control described above, the processor 42, when cutting out the products, drives the cutting head 24 according to the drive status specified by the read-in cutting status data. Further, in the above-described control process, the processor 42 adjusts the operation of collecting dust (ventilation) from the exhaust chambers (see FIG. 2) 34A-34F inside the table 12 according to the position of the cutting head 24 in the X-axis direction.

To control the movement of the cutting head 24 as described above, the processor 42 outputs to the moving carriage 18 and the carriage 22, respectively, a Y-axis direction speed instruction and an X-axis direction speed instruction. At the moving carriage 18, an X-axis servo amp 60 controls a rotation speed of an X-axis drive motor 62 according to the X-axis direction speed instruction. An X-axis drive mechanism 64 (such as a rack and pinion mechanism or a ball screw mechanism) is driven by the X-axis drive motor 62, moving the moving carriage 18 in the X-axis direction. An X-axis displacement sensor 66 (such as a rotary encoder coupled to the pinion shaft or the ball screw mechanism) detects the displacement of the moving carriage 18 in the X-axis direction. The processor 42, using the detection signal of the X-axis displacement sensor 66 as feedback, calculates the position of the cutting head 24 in the X-axis direction and uses this in the position control calculation of the cutting head 24 in the X-axis direction. At the carriage 22, a Y-axis servo amorphous material portion 70 controls the rotation speed of a Y-axis drive motor 72 according to a Y-axis speed instruction. A Y-axis drive mechanism 74 (such as a rack and pinion mechanism or a ball screw mechanism) is driven by the Y-axis drive motor 72, moving the carriage 22 in the Y-axis direction. A Y-axis displacement sensor 76 (such as a rotary encoder coupled to the pinion shaft or the ball screw mechanism) detects the displacement of the carriage 22 in the Y-axis direction. The processor 42, using the detection signal of the Y-axis displacement sensor 76, calculates the position of the cutting head 24 in the Y-axis direction and uses this in the position control calculation of the cutting head 24 in the Y-axis direction.

To control the driving of the cutting head 24 as described above, the processor 42 outputs a head output control command to a head drive device 80 (such as a plasma power supply and gas supply valve in the case of a plasma cutting machine, or a laser oscillator in the case of a laser cutting machine). The head drive device 80 adjusts the output power of the cutting head 24 according to the head output control command.

To control the operation of collecting dust from (ventilating) the exhaust chambers (see FIG. 2) 34A-34F as described above, the processor 42 outputs a cutting start signal designating the start of the cutting process, a cutting end signal designating the end of the cutting process, and a head position signal indicating the position of the cutting head 24 in the X-axis direction to an exhaust control circuit 90. The exhaust control circuit 90 may be mounted inside the table 12 or it may be incorporated in the controller 40.

The exhaust control circuit 90, when it receives a cutting start signal from the processor 42, operates all the fan drive mechanisms 94A-94F that are mounted on the blower fan mounting 53 and drives all the blower fans 51A-51F. In addition, when it receives a cutting end signal from the processor 42, the exhaust control circuit 90 operates all the fan drive mechanisms 94A-94F mounted on the blower fan mounting 53 and stops driving all the blower fans 51A-51F. In this manner, the exhaust control circuit 90 drives and stops the plurality of blower fans 51A-51F all at once (for example, controlling them so as to output a predetermined wind speed (such as 1 m/sec)). It should be noted that the exhaust control circuit 90 may also control the plurality of blower fans 51A-51F individually. For example, the exhaust control circuit 90 may control the rotation speed of blower fans 51C and 51D, 51A and 51B, and 51E and 51F separately, so as to vary the amount of air blown into the current target exhaust chamber, the past target exhaust chamber and the future target exhaust chamber, respectively (specifically, for example, so that a large volume of air is blown into the current target exhaust chamber and the past target exhaust chamber and a small volume of air is blown into the future target exhaust chamber).

Based on the head position signal, the exhaust control circuit 90 selects from among the plurality of blower dampers 6A-6F which blower damper(s) should be opened, and further, selects from among the plurality of exhaust dampers 96A-96F which exhaust damper(s) should be opened. The exhaust control circuit 90 then controls blower damper drive mechanisms (for example, a combination of electromagnetic valves and air cylinders). 1A-1F and exhaust damper drive mechanisms (for example, a combination of electromagnetic valves and air cylinders) 96A-96F so as to open only the selected blower damper(s) and exhaust damper(s). A specific example is described below.

Figure 4:
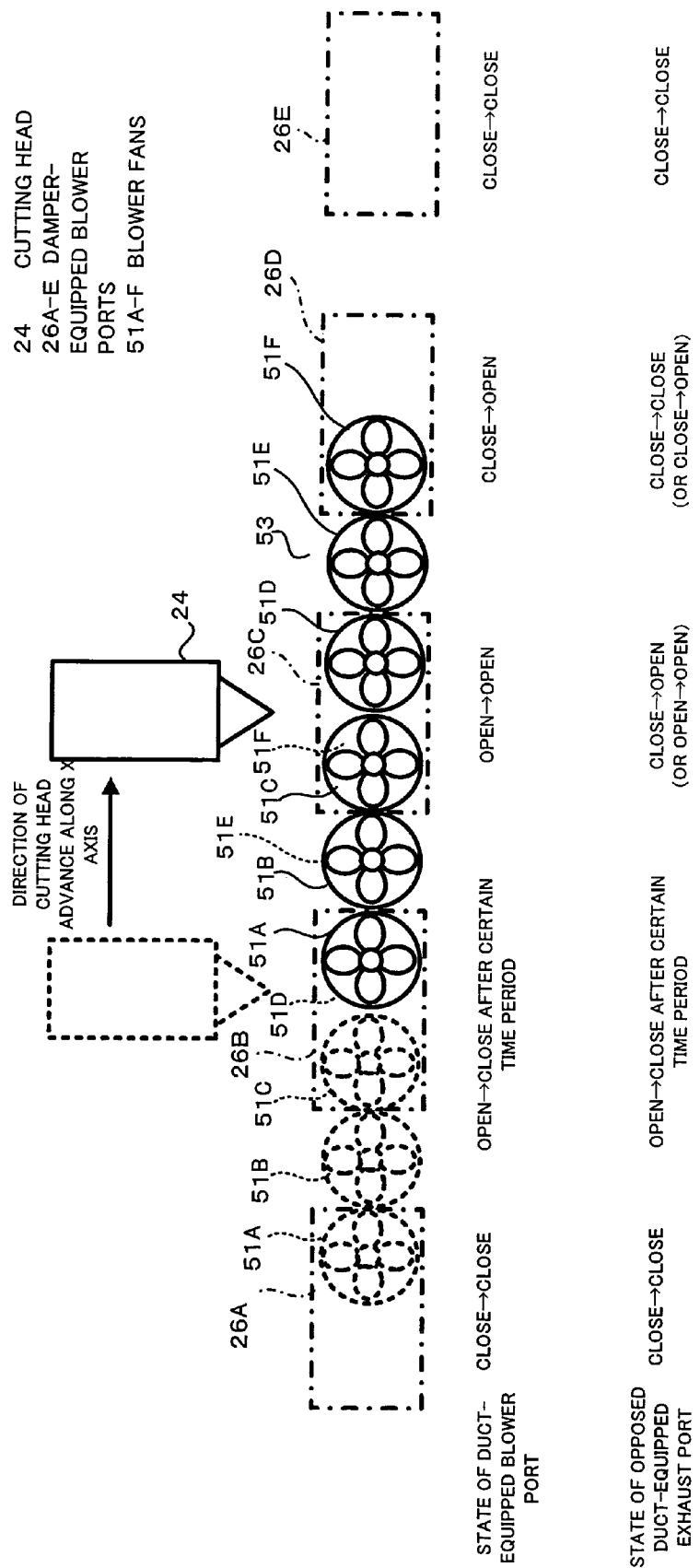
FIG. 4 shows the relation between cutting head position and damper open/closed states.

FIG. 4 shows the relation between cutting head position and damper open/closed states.

FIG. 4 shows what happens when the cutting head 24 moves along the X-axis direction. In FIG. 4, the dotted lines indicate past positions of the cutting head 24, the blower fan mounting 53 and the blower fans 51A-51F. In addition, in FIG. 4, the solid lines indicate the current positions of the cutting head 24, the blower fan mounting 53 and the blower fans 51A-51F. Moreover, in FIG. 4, the dotted-and-dashed lines indicate the blower ports 26A-26E.

In the past, the blower fan 51A was positioned near the blower port 26A and forward of it in the Y-axis direction, the blower fan 51B was positioned between blower ports 26A and 26B and forward of them in the Y-axis direction, the blower fans 51C and 51D were positioned near blower port 26B (the blower port adjacent to blower port 26A and forward of it in the X-axis direction) and forward of it in the Y-axis direction, blower fan 51E was positioned between blower ports 26B and 26C and forward of them in the Y-axis direction, and blower fan 51F was positioned near blower port 26C and forward of it in the Y-axis direction. These relative positions of the blower fans 51A-51F and the blower ports 26A-26F may, for example, be calculated on the basis of the head position signal that the exhaust control circuit 90 receives from the processor 42 (the position of the cutting head 24 in the X-axis direction as calculated by the processor 42). In this case, at a given point in the past, the exhaust control circuit 90 closed the dampers of blower port 26A and exhaust port 36A of exhaust chamber 34A, opened the dampers of blower port 26B and exhaust port 36B of exhaust chamber 34B which became the target exhaust chamber, and opened the damper of blower port 26C of exhaust chamber 34C which will become the future target exhaust chamber but closed the damper of that chamber's exhaust port 36C (which may be opened), while closing the dampers of the blower ports and exhaust ports of the other exhaust chambers 34D-34F.

Here, as shown in FIG. 4, the moving carriage 18 has moved the length of three blower fans forward in the direction of the X axis, which moves the position of the cutting head 24 in the X-axis direction from directly above exhaust chamber 34B to directly above adjacent exhaust chamber 34C. In addition, the relative positions of the blower fans 51A-51F and the blower ports 26A-26F changes as follows: Specifically, blower fan 51A is positioned near blower port 26B and forward of it in the Y-axis direction, blower fan 51B is positioned between blower ports 26B and 26C and forward thereof, blower fans 51C and 51D are positioned near blower port 26C and forward of them in the Y-axis direction, blower fan 51E is positioned between blower ports 26C and 26D and forward of it in the Y-axis direction, and blower fan 51F is positioned near blower port 26D and forward of it in the Y-axis direction. These relative positions also can be calculated on the basis of, for example, the head positions signal that the exhaust control circuit 90 receives from the processor 42. In this case, the exhaust control circuit 90 maintains the dampers of blower port 26A\* and exhaust port 36A\* of the past target exhaust chamber 34B in an open state until a predetermined period of time after the movement described above elapses, and closes them after that predetermined period of time elapses. In addition, the exhaust control circuit 90 the current target keeps the damper of the blower port 26C of the current exhaust chamber 34C open and switches the damper of the chamber's exhaust port 36B\* from a closed state to an open state (or keeps it open). In addition, the exhaust control circuit 90 switches the damper of blower port 26D of the next target exhaust chamber 34D from a closed state to an open state, and maintains the damper of the chamber's exhaust port 36D in a closed state (or switches it from a closed state to an open state). The exhaust control circuit 90 maintains the dampers of the blower ports and the exhaust ports of all the other exhaust chambers 34E and 34F in a closed state.

It should be noted that, with respect to the past target exhaust chamber, the "predetermined period of time" for which the dampers of the blower ports and the exhaust ports are kept open, as described above, is the length of time fumes and other exhaust smoke are likely to remain, and is for example several seconds. The predetermined period of time may, for example, be based on at least one of the wind speed and volume of the blower fans and on the length in the Y-axis direction of the exhaust chambers, and stored in advance in the storage device 44 of the controller 40. In that case, the exhaust control circuit 90, based on the predetermined period of time data stored in the storage device 44, recognizes a predetermined period of time for maintaining the dampers of the blower ports and the exhaust ports in an open state. The exhaust control circuit 90, for example, can determine whether or not the predetermined period of time has elapsed using a timer or the like.

Figure 5:
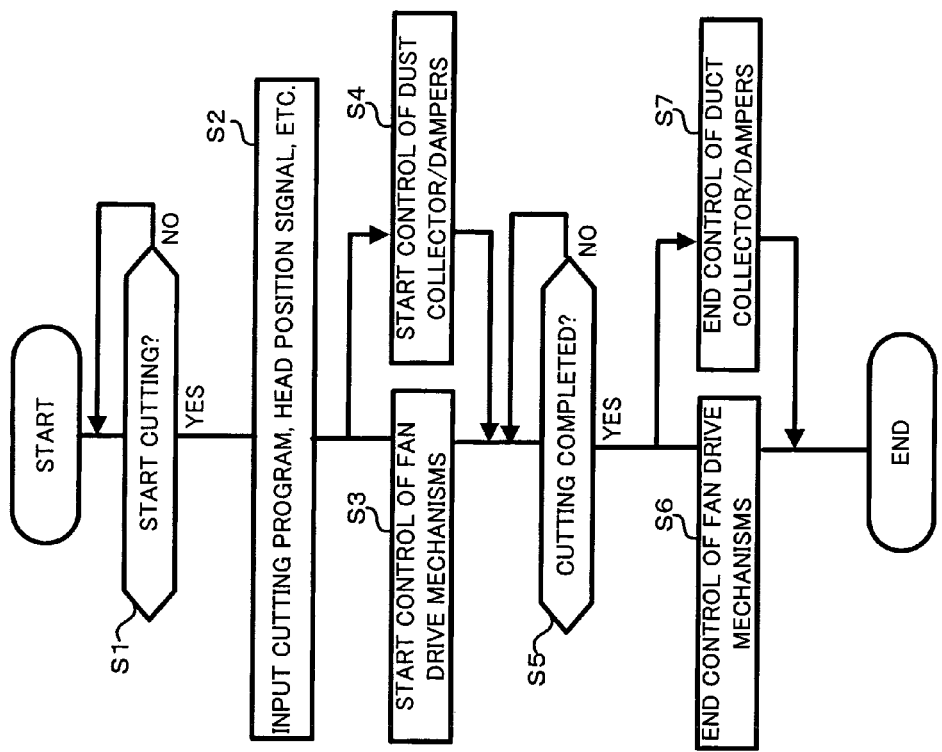
FIG. 5 is a flow chart illustrating blower control.

FIG. 5 is a flow chart illustrating blower control.

When the processor 42 of the controller 40 receives from the user a command to start the work of the cutting process and starts cutting (YES in step S1), it inputs the cutting program 50, the head position signals and the like (S2) and starts operating the fan drive mechanisms 94A-94F, the dust collector 30 and the dampers 96A-96F and 6A-F (S3 and S4). In the routine of S3, for example, the processor 42 inputs the cutting start signal to the exhaust control circuit 90, and the exhaust control circuit 90 operates the fan drive mechanisms 94A-94F and drives the plurality of blower fans 51A-51F.

Then, when the processor 42 of the controller 40 receives a command to end the cutting process and ends cutting (YES in step S5), it ends operation of the fan drive mechanisms 94A-94F, the dust collector 30 and the dampers 96A-96F and 6A-6F (S6 and S7). In the routine of S6, for example, the processor inputs the cutting end signal to the exhaust control circuit 90, and the exhaust control circuit 90 operates the fan drive mechanisms 94A-94F and stops driving the plurality of blower fans 51A-51F.

FIG. 6 is a flow chart illustrating damper control.

The exhaust control circuit 90 inputs the cutting program 50, head position signal and the like (S11), and from the input head position signal determines which of the plurality of exhaust chambers 34A-34F is the current target exhaust chamber (S12). The exhaust control circuit 90 then puts the blower damper and the exhaust damper of the chamber determined to be the current target exhaust chamber into an open state, opens the blower damper of the future target exhaust chamber, puts that chamber's exhaust damper in a closed state, and further, maintains the exhaust dampers and the blower dampers of the other exhaust chambers in their current state (S13).

The exhaust control circuit 90 counts the time elapsed since moving to the current target exhaust chamber (S14).

If the results of S14 indicate that the counted elapsed time has not reached the predetermined period of time, the exhaust control circuit 90 continues to count the above-described elapsed time as long as the cutting head 24 does not move directly over another exhaust chamber (NO in S15). If the cutting head 24 has moved directly over another exhaust chamber while the counted elapsed time has not yet reached the predetermined period of time (YES in S15), processing from S11 onward is carried out.

If the results of S14 indicate that the counted elapsed time has reached the predetermined period of time, the exhaust control circuit 90 closes the past target exhaust chamber exhaust damper and blower damper (S16). Thereafter, the exhaust control circuit 90 maintains the current state as long as the cutting head 24 does not move directly over another exhaust chamber (NO in S17). If the cutting head 24 has moved directly over another exhaust chamber (YES in S17), processing from S11 onward is carried out.

It should be noted that, in the process described above, it is possible that, for example, the moving carriage 18, by advancing forward along the X-axis direction and returning rearward of it in the X-axis direction, causes the past target exhaust chamber to switch to the future target exhaust chamber before the predetermined period of time after the cutting head 24 passes directly over the past target exhaust chamber elapses (that is, before the exhaust fumes of that past target exhaust chamber have been adequately discharged). In that case, the exhaust control circuit 90, even though it detects the switch, may accord priority to control for the past target exhaust chamber up to that point until the above-described predetermined period of time elapses and continue control of the future target exhaust chamber with control like that for the past target exhaust chamber. In other words, the exhaust control circuit 90, even though it detects the switch, may maintain the exhaust damper for that future target exhaust chamber in an open state until a predetermined period of time elapses since the cutting head 24 recently passed, and carry out control of the future target exhaust chamber after the predetermined period of time elapses (for example, closing the open exhaust damper).

The foregoing constitutes a description of the present embodiment. Variations like those described below may serve as several possible variations of this embodiment.

For example, each of the plurality of blower fans 51A-51F may be provided with a blower duct for guiding the wind from that blower fan. In this case, the blower fans 51A-51F and the blower ducts provided thereon move together with the movement of the moving carriage 18, so that, when the blower fans are positioned forward of a blower port in the Y-axis direction, the wind generated by the blower fans is guided without leakage to the extent possible to the exhaust chamber through that chamber's blower port.

Figure 7A:
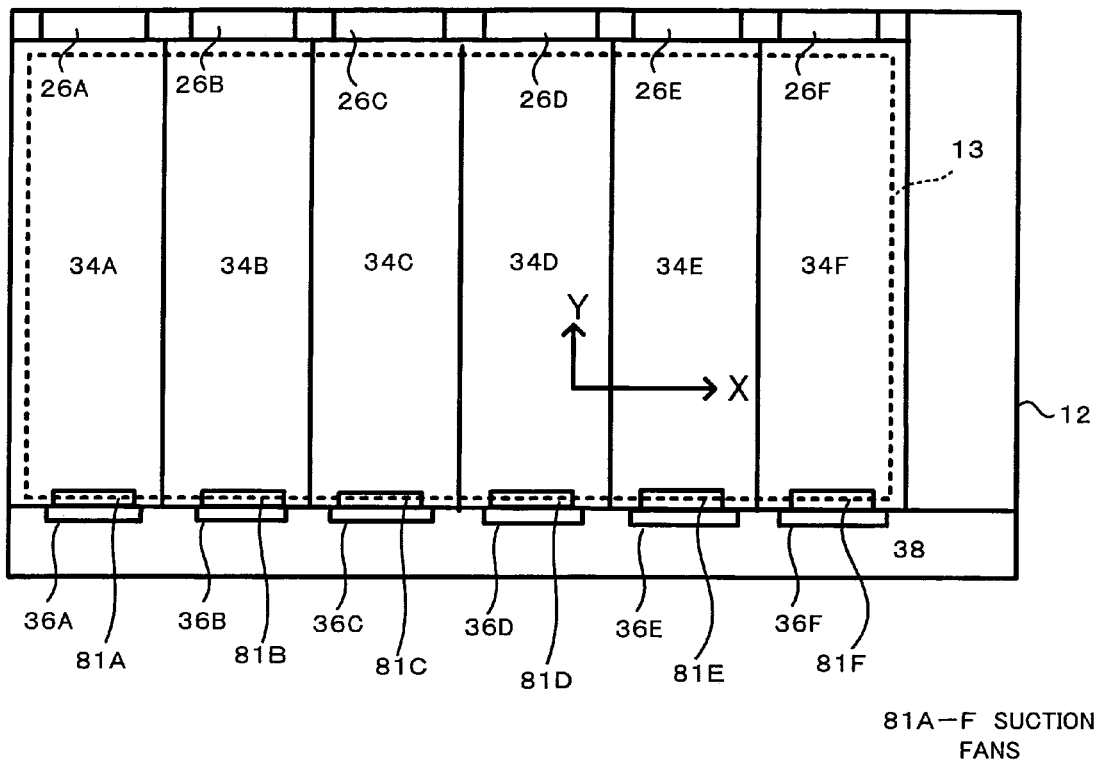
FIG. 7A shows the internal structure of the table according to a variation of an embodiment of the present invention.
Figure 7B:
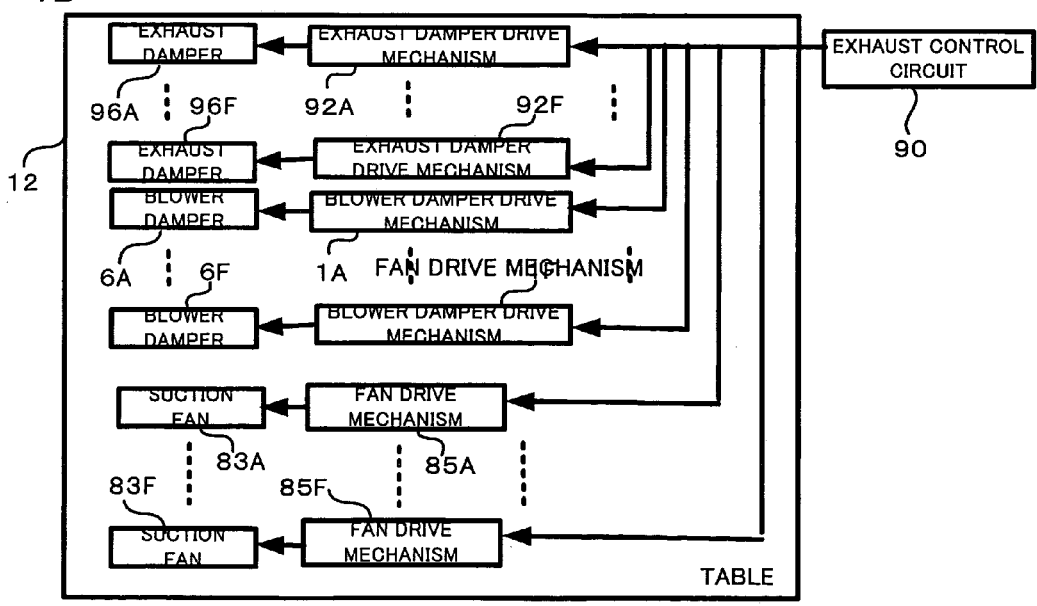
FIG. 7B shows objects of control by the controller in the table shown in FIG. 7A.

In addition, as shown in FIG. 7A, suction fans 81A-81F for aiding in the discharge of air from inside an exhaust chamber to outside the exhaust chamber may be mounted on the exhaust ports 36A-36F (or the vicinities thereof) of the exhaust chambers 34A-34F. In this case, as shown in FIG. 7B, the exhaust control circuit 90 may control fan drive mechanisms 85A-85F and control the driving of the suction fans 83A-83F. In addition, with that control, for example, the exhaust control circuit 90 may operate so as to drive only the suction fans of the exhaust chambers for which the exhaust dampers are open, and not drive the suction fans of the exhaust chambers whose exhaust dampers are closed. It should be noted that the suction fans 36A-36F may be fixed relative to the movement of the blower fans 51A-51F.

The foregoing constitutes one of several variations.

However, with the present invention, several other variations are also possible. (It should be noted that at least one of the variations described above may be applied to at least one of these other embodiments.) Below, a description is given of specific other embodiments, describing mainly the differences with the embodiment described, with descriptions of the commonalities with the above-described embodiment omitted.

FIG. 8 is one diagram illustrating a first other embodiment of the present invention. FIG. 9 shows the relation between blower fan and blower port positions in the first other embodiment of the present invention. The positions of the blower fans 151A-151F indicated by the solid lines shown in FIG. 9 correspond to the positions of the blower fans 151A-151F shown in FIG. 8.

As shown in FIG. 8, in the first other embodiment, the width of the blower ports 126A-126F extends substantially (for example, 80 percent or more) across the entire width of the exhaust chambers 34A-34F. (It should be noted that "width" here, for example, if the exhaust ports are rectangular in the X-axis direction as shown in the drawing, can mean the long side, and where the length in the X-axis direction differs depending on position, can mean length at a particular position (for example, the position of maximum length)). Put differently, for example, the distance between each of the blower ports 126A-126F and the adjacent blower ports is exactly or substantially the same as the thickness of the dividers that divide the interior of the table 12. The width of the exhaust ports 136A-136F, like the blower ports, may extend over substantially the entire width of the exhaust chambers 34A-34F.

In addition, as shown in FIG. 8 and FIG. 9, with the first other embodiment, the plurality of blower fans 151A-151D is aligned at intervals such that two or more blower fans are disposed opposite a single exhaust chamber blower port, which enables air to be blown into one exhaust chamber by two or more blower fans at all times no matter above which exhaust chamber 34A-34F the cutting apparatus is positioned.

Moreover, with the first other embodiment, as with the embodiment described above, the plurality of blower fans 151A-151D is aligned at intervals therebetween that are narrower than the width of a single fan. Specifically, for example, the plurality of blower fans 151A-151D is aligned with substantially no interval therebetween.

Figure 10A:
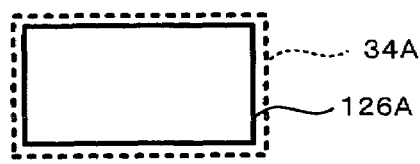
FIG. 10A shows an example of blower port height.

According to this first other embodiment, the width of the blower ports 126A-126F extends substantially across the entire width of the exhaust chambers 34A-34F, thereby enabling the amount of air that can be blown into a single exhaust chamber to be increased. This arrangement is even more preferable if, as shown in FIG. 8 and FIG. 9, the height of the blower ports 126A-126F (length along the Z axis) is such as to accommodate all of the wind sent by the blower fans. In addition, this arrangement, as illustrated in FIG. 10A, is even more preferable if the height of the blower ports 126A-126F extends over substantially the entire height of the exhaust chambers 34A-34F (FIG. 10A illustrates blower port 126A and exhaust chamber 34A), which may be the same for exhaust chambers 136A-136F as well.

In addition, according to this first other embodiment, the wind from two or more fans flows into one exhaust chamber simultaneously, which enables more air to flow through one exhaust chamber than when there is one fan.

Moreover, according to this first other embodiment, the plurality of blower fans 151A-151D is aligned at intervals therebetween narrower than the width of one fan. As a result, more blower fans can be packed into a given distance, which enables the amount of air that can be blown into one exhaust chamber to be increased.

Figure 10B:
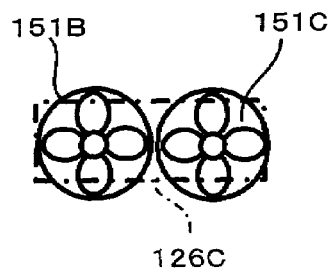
FIG. 10B shows another example of blower port height.
Figure 10C:
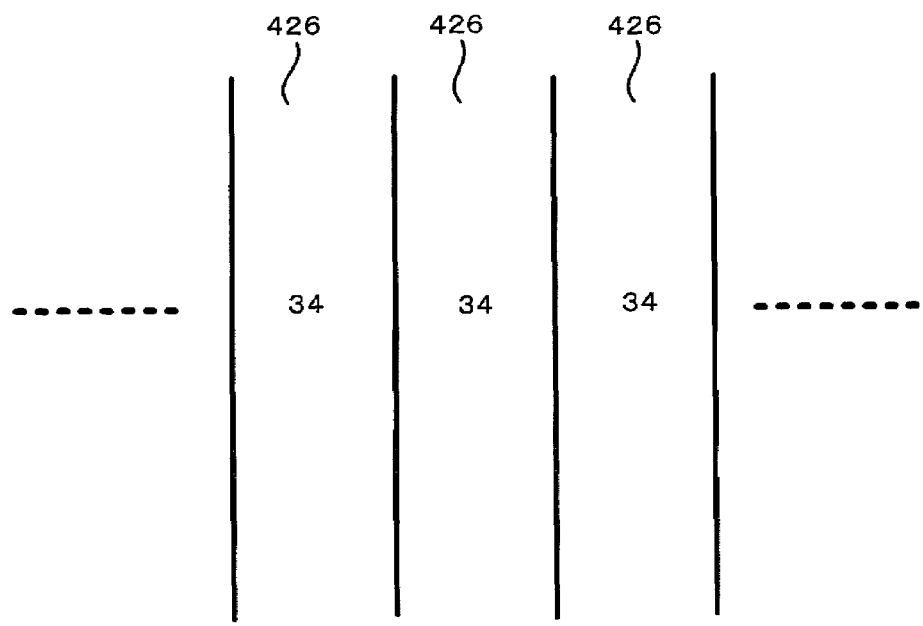
FIG. 10C shows a variation of the blower port.

The foregoing constitutes a description of a first other embodiment. It should be noted that, in the first other embodiment, for example, as illustrated in FIG. 10B, the height of the blower port (for example 126C) may be shorter than the height of one blower fan. In addition, for example, as illustrated in FIG. 10C, not only the exhaust chambers 34 but also the exhaust chamber 34 blower ports 426 (and/or exhaust ports) may be formed by partition panels 425 that divide the interior of the table 12. That illustrated in FIGS. 10A through 10C may also be applied to other embodiments.

Next, a description is given of a second other embodiment of the present invention.

Figure 11:
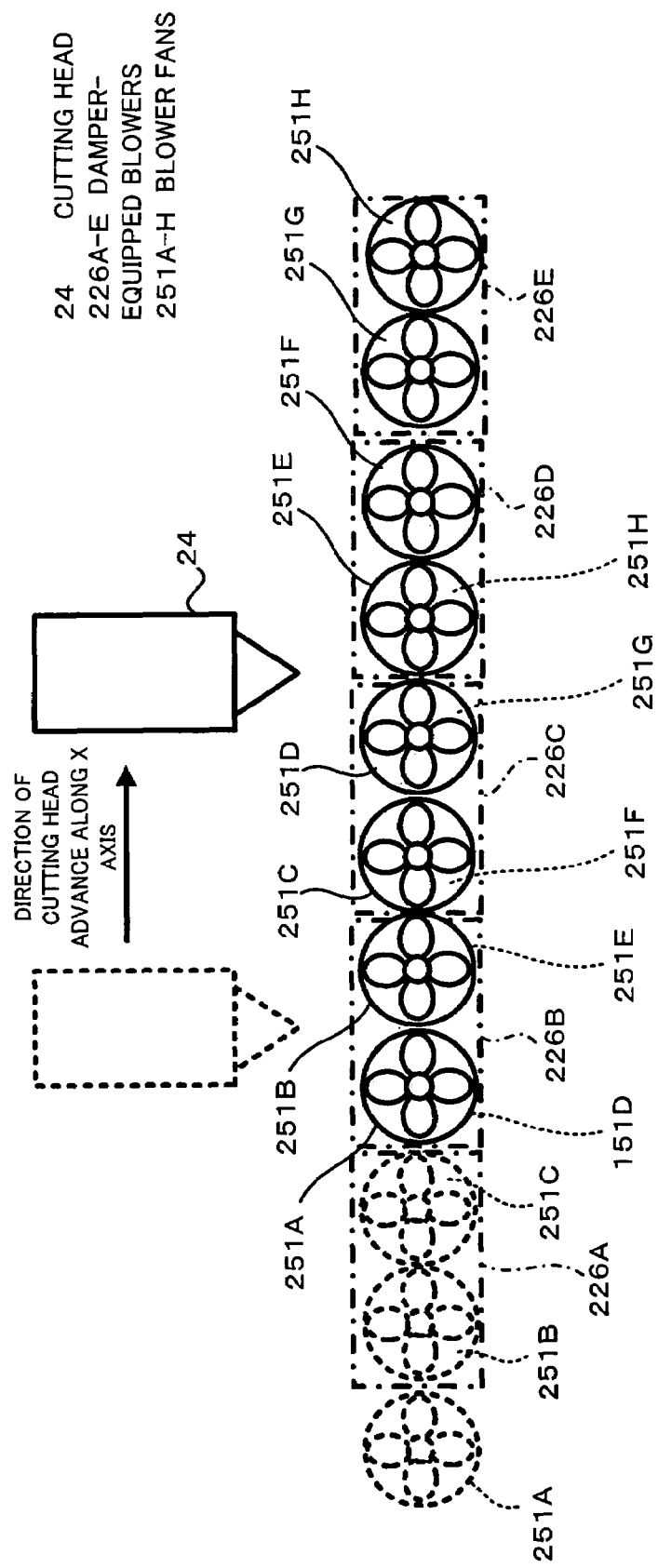
FIG. 11 shows the relation between blower fan and blower port positions in a second other embodiment of the present invention.

FIG. 11 shows the relation between blower fan and blower port positions in the second other embodiment of the present invention.

In this second other embodiment, a plurality of blower fans 251A-251H is aligned so as to extend over the width or more of at least three exhaust chambers, such that, for example, no matter above which exhaust chamber the cutting position is located, air can be blown into at least three exhaust chambers simultaneously at all times. The at least three exhaust chambers may, for example, be the target exhaust chamber directly below the cutting position and the exhaust chambers adjacent thereto on both sides.

In this second other embodiment, other matters may be arranged similarly to, for example, the embodiment described above and the first other embodiment.

According to this second other embodiment, air can be blown into not only the target exhaust chamber but also the exhaust chamber adjacent thereto in one direction in which exhaust fumes likely remain even though the cutting head 24 has already passed as well as the exhaust chamber adjacent thereto in the other direction over which the cutting head 24 can move in the future.

Figure 12:
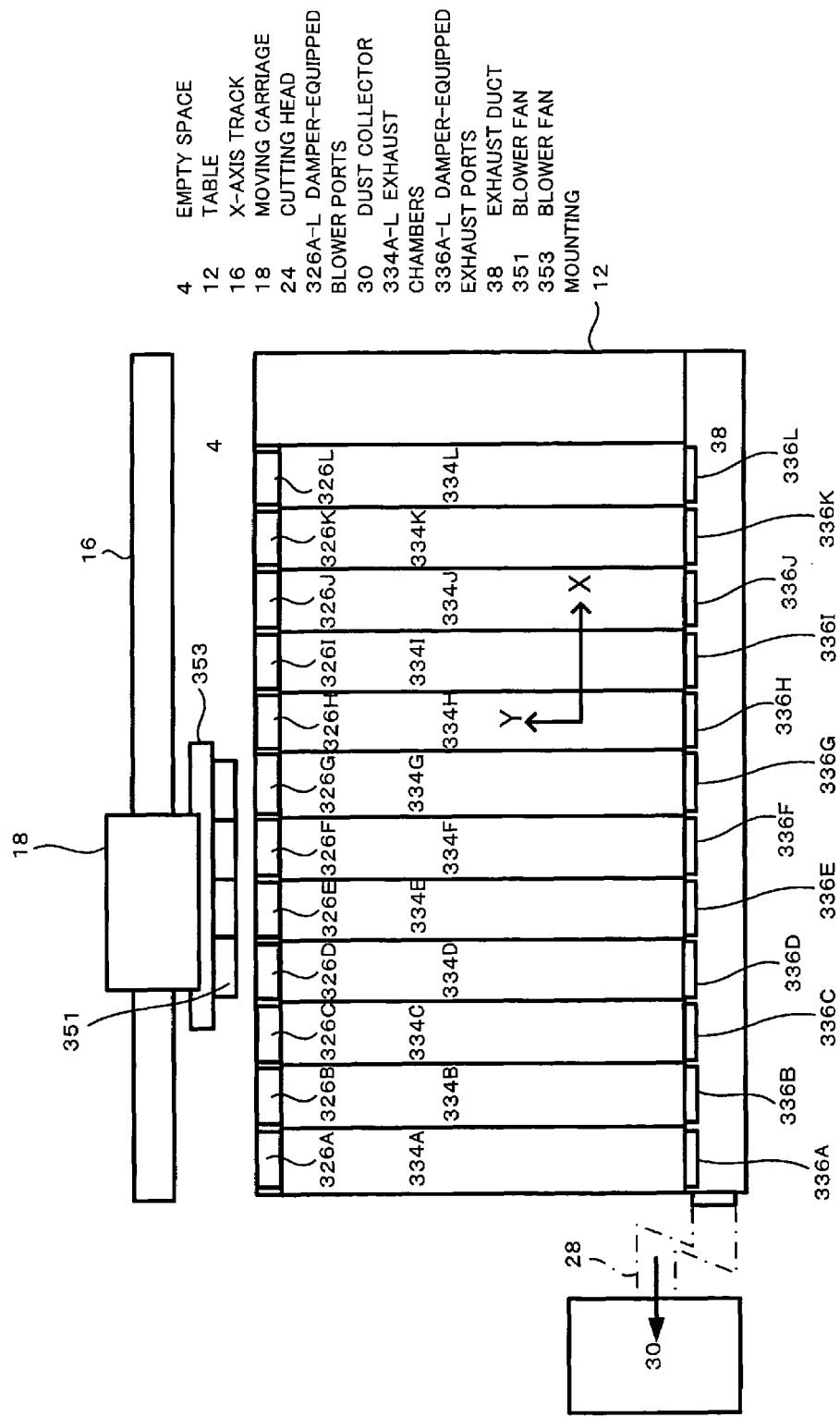
FIG. 12 illustrates a variation of the second other embodiment of the present invention.
Figure 13:
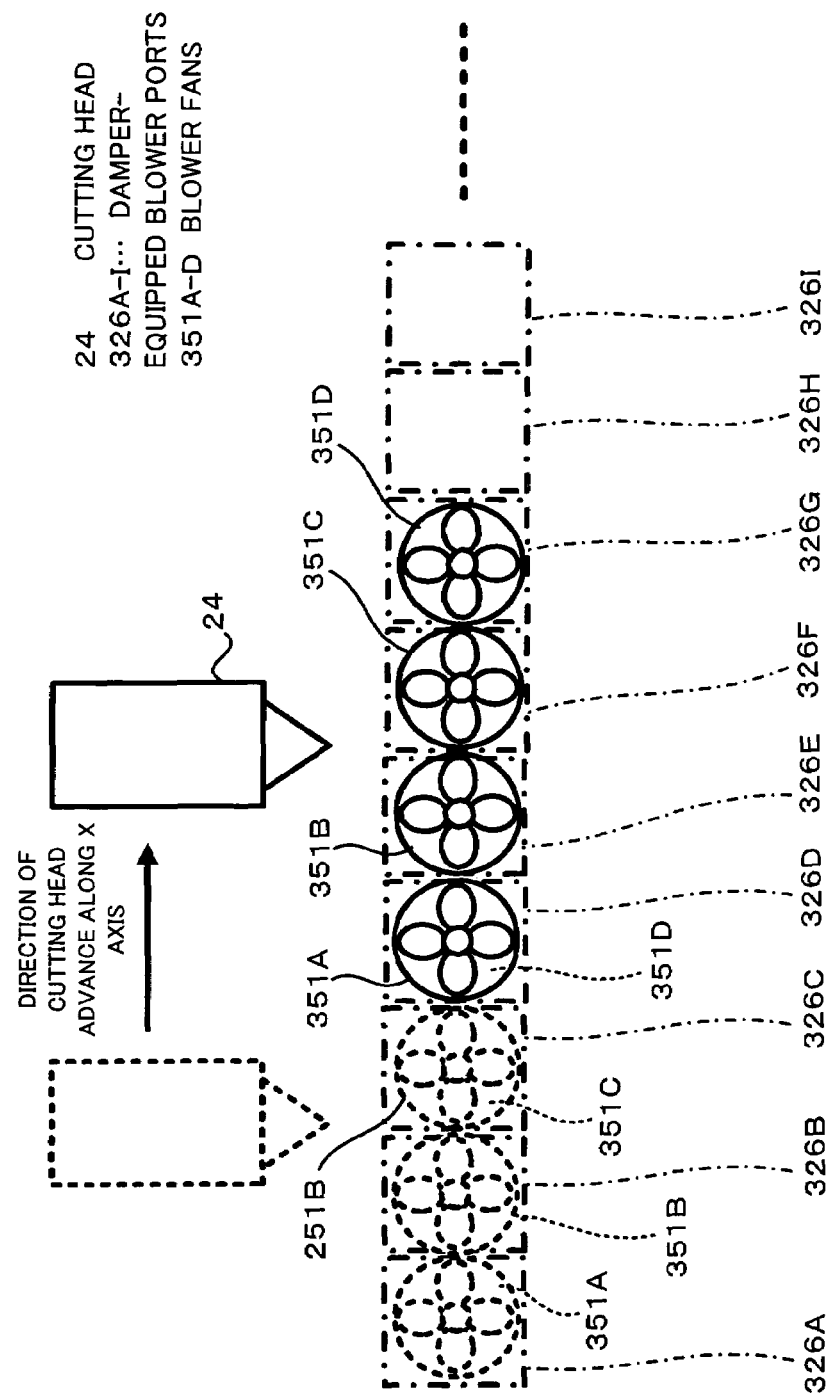
FIG. 13 shows the relation between blower fan and blower port positions in the variation of the second other embodiment of the present invention.

It should be noted that, with respect to this second other embodiment, the following variations are possible: For example, as one variation, if it is arranged so that it is possible to blow air into at least three exhaust chambers simultaneously as shown in FIG. 12 and FIG. 13, then the number of fans that can blow air into a single exhaust chamber may be one. In other words, for example, the width of exhaust chambers 334A-334L may be substantially the same as the width of a single blower fan 351. In addition, and concurrently, the width of the blower ports 326A-326L and/or exhaust ports 336A-336L of the exhaust chambers 334A-334L may extend over substantially the entire width of the exhaust chambers 334A-334L.

Although the foregoing describes several embodiments and several variations of the present invention, it is to be understood that these embodiments and variations are merely illustrative of the present invention and that the scope of the present invention is not limited thereto. Consequently, it is to be understood that the present invention encompasses all the various other embodiments by which the invention can be implemented. Thus, for example, an opening/closing member such as a damper or the like need not be provided on at least one or the other of the blower port and the exhaust port.

What is claimed is:

1. A cutting machine comprising:
   a table for accommodating a plate;
   a moving carriage;
   a cutting head attached to said moving carriage for cutting said plate placed on said table;
   a head movement system that moves said cutting head;
   a plurality of exhaust chambers aligned so as to partition an interior of said table;
   blower ports provided along one end side of said each exhaust chamber;
   exhaust ports provided along another end side of said each exhaust chamber; and
   a plurality of fans attached to the moving carriage and aligned parallel to a direction of movement that blow air into at least one of said exhaust chamber from said exhaust port of said exhaust chamber while moving along an outside of said table,
   wherein said plurality of fans are aligned so that two or more said fans are disposed opposite said blower port of said one exhaust chamber, said two or more fans blowing air into said one exhaust chamber simultaneously.

2. The cutting machine according to claim 1, wherein a width of said each blower port of said each exhaust chamber is substantially an entire width of said each exhaust chamber, such that two or more said fans blow air across the entire width of at least one said exhaust chamber.

3. The cutting machine according to claim 1, said plurality of fans are aligned at intervals therebetween that are narrower than a width of one fan.

4. The cutting machine according to claim 3, wherein said plurality of fans are aligned substantially without intervals therebetween.

5. A cutting machine comprising:
   a table for accommodating a plate;
   a moving carriage;
   a cutting head attached to said moving carriage for cutting said plate placed on said table;
   a head movement system that moves said cutting head;
   a plurality of exhaust chambers aligned so as to partition an interior of said table;
   blower ports provided along one end side of said each exhaust chamber;
   exhaust ports provided along another end side of said each exhaust chamber; and
   a plurality of fans attached to the moving carriage and aligned parallel to a direction of movement that blow air into at least one of said exhaust chambers from said exhaust port of said exhaust chamber while moving along an outside of said table,
   wherein said plurality of fans are aligned over a distance equal to or greater than a width of at least three of said exhaust chambers, so as to enable air to flow into said at least three of said exhaust chambers simultaneously.

6. The cutting machine according to claim 5, wherein a width of said each blower port of said each exhaust chamber is substantially an entire width of said each exhaust chamber, such that two or more said fans blow air across an entire width of at least one said exhaust chamber.

7. The cutting machine according to claim 5, wherein said plurality of fans are aligned at intervals therebetween that are narrower than a width of one fan.

8. The cutting machine according to claim 7, wherein said plurality of fans are aligned substantially without intervals therebetween.

* * * * *